United States Patent Office 3,075,082
Patented Jan. 22, 1963

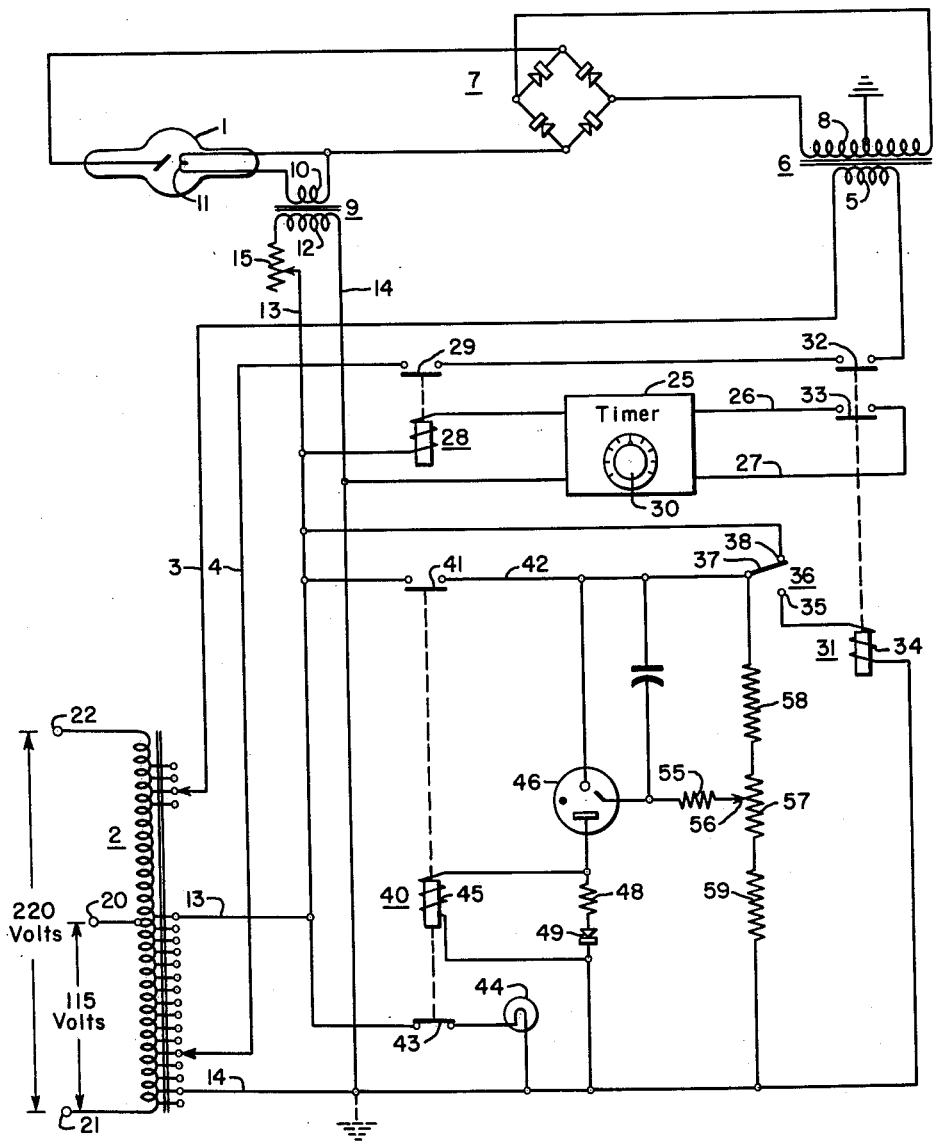

3,075,082
X-RAY APPARATUS
Kenneth A. Kiesel, Baltimore, Md., assignor to Westinghouse Electric Corporation, East Pittsburgh, Pa., a corporation of Pennsylvania
Filed July 23, 1959, Ser. No. 829,123
5 Claims. (Cl. 250—95)

The present invention relates to X-ray apparatus and more particularly a monitoring system, in connection with such apparatus, for indicating an excessive voltage drop under load conditions and automatically terminating energization of the apparatus upon existence of such voltage drop.

The current trend in X-ray techniques and apparatus is toward higher power, both in kilovoltage and milliamperage, and the supply line capacities required for such apparatus has necessarily been increased. This presents no serious problem with permanently installed X-ray apparatus, since an adequate supply line can be provided. In the case of portable or mobile X-ray apparatus, however, for example, the situation is quite different, in that these portable units, in most cases, are plugged into existing supply lines, the capacity of which may vary over a wide range from line to line.

Most portable and mobile X-ray units are designed to operate from either a 220 volt or a 115 volt supply line in order to provide for maximum flexability of use. Except for some very new hospitals, 220 volt lines are available in only a few special locations, and the 115 volt lines may have capacities of from 10 to 50 amperes. The maximum power output and, in many cases, the technique used in making an X-ray exposure is limited to the capacity of the supply line.

The problem is to determine what maximum X-ray output to be obtained from a particular supply line is possible, or, to determine whether or not a desired technique can be used without overloading the supply line. Previous techniques heretofore employed to solve this problem have included the making of test exposures throughout a hospital at the several locations where the apparatus is to be employed, or the measuring by metering circuits of the line voltage drop under load to give visual indications of the existence and degree of such drop. The former test-exposure technique is time-consuming, expensive, and not completely satisfactory since supply line capacities may change from time to time at a given location depending on what additional loads may be connected to that particular line, while the load-metering technique requires a somewhat lengthy test exposure in order for the meter reading under load condition to persist long enough to be read, in order that the operator may determine whether or not an excessive line voltage drop resulted.

In either of the methods heretofore employed as described above, a line voltage drop during an actual X-ray exposure will produce an unsatisfactory radiograph, so that a second exposure is required and this results in approximately twice the radiation dosage that the patient normally would be subjected to were the excessive line voltage drop non-existent. Considerable disturbance of the patient and wasting of the operator's time also results.

The prime object of the present invention resides in the obviation of the above techniques and solution of the problem by provision of means incorporated in such portable X-ray apparatus which monitors the supply line or associated voltage and automatically terminates an X-ray exposure and energizes an indicator lamp upon drop in supply line voltage below a predetermined value.

Other objects and advantages of the invention will become apparent from the following detailed description thereof when taken in connection with the accompanying drawing, in which the single FIGURE illustrates diagrammatically an X-ray apparatus embodying the invention.

Referring to the drawing, the X-ray apparatus embodying the invention comprises the usual X-ray tube 1 and the usual energizing network for such tube, which network may comprise an autotransformer 2, conductors 3 and 4 for connecting selective kilovoltage-varying taps of the autotransformer 2 to a primary winding 5 of the high voltage transformer 6, and the high voltage circuit 7 connecting the secondary 8 of the high voltage transformer 6 across the X-ray tube 1. Such energizing network also will include the usual filament transformer 9 having its secondary 10 connected to the filament 11 of X-ray tube 1 and having its primary winding 12 connected via conductors 13 and 14 to suitable taps on the autotransformer 2 to provide such as 115 volt excitation of such primary winding.

To provide for regulation of the degree of energization of the X-ray tube 1, a potentiometer 15 is included in the energizing circuit for the primary winding 12 of the filament transformer 9. By varying the adjustment of the potentiometer 15, in the well-known manner, current supplied to the filament 11 of the X-ray tube 1 may be regulated for varying the X-ray output from such tube. It will be apparent that by such regulation of the X-ray output from the tube 1, the load presented by such tube to the autotransformer 2, hence the supply lines to which it may be connected, may be varied.

The autotransformer 2 may be provided with terminals 20 and 21 for connection to a 115 volt supply line, as well as with an additional terminal 22 for connection, in conjunction with terminal 21, to a 220 volt supply line. Conductors 13 and 14 will be tapped into such transformer 2 in a manner which will provide such as a 115 volt supply to these conductors irrespective of which of the two supply line voltages may be furnished the transformer.

In order to provide the usual regulation for timing the X-ray exposure, the usual timer 25 is included in the X-ray apparatus which will respond to establishment of electrical connection between conductors 26 and 27 to effect an energizing connection across such as conductors 13 and 14 for a timer relay 28 to close its contact 29 in series with the primary winding 5 of the high voltage transformer 6. Following a period of time determined by position of an operator's control knob 30, the timer 25 will respond to effect deenergization of timer relay 28 to enable its contact 29 to open. The timer 25 when of the usual form, will be capable of effecting exposure time control within a range which varies from a minimum of 1/20 of a second to 12 seconds, for example.

In accordance with preferential structural features of the invention, the means for terminating energization of the X-ray tube 1 responsively to a certain voltage reduction in its energizing network comprises, in general, a relay means 31 having a normally open contact 32 in series with the primary winding 5 of the high voltage transformer 6 and with the normally open contact 29 of the timer relay 28, and a normally open contact 33 for controlling connection of timer control conductors 26 and 27. Relay means 31 also includes the usual winding 34 having one terminal thereof connected to the conductor 14 and the opposite terminal thereof connected to a contact 35 in an operator's exposure-initiating switch means 36. Switch 36 includes a movable contact 37 which may be biased toward a fixed contact 38 connected to the conductor 13, for reasons which hereinafter will become apparent. Also included is a relay means 40 having a normally open contact 41 connected in series with the conductor 13 and with a conductor 42 which is constantly connected to the movable contact 37 of the operator's exposure-initiating switch 36. Relay means 40 also comprises a normally closed contact 43 which is connected in series with an excessive-voltage-drop-indicating lamp 44 between conductors 13 and 14.

For controlling energization of the winding 45 of the relay means 40, the fast-acting switch means in the form of a thyratron tube 46 is provided having its cathode connected to the conductor 42 and its plate connected, in series with such winding 45, to the conductor 14. Since pulsating direct current is supplied via the thyratron 46 to the winding 45 of relay means 40, a series-connected resistor 48 and rectifier 49 are connected across such winding to maintain this winding effectively energized during the "off" half cycle to prevent relay 40 from chattering. The value of resistor 48 is selected such that the "off" half cycle current through winding 45 will persist just slightly longer than the duration of such half cycle, so that when the thyratron 46 stops conducting the relay means 40 will open very rapidly.

To control conduction of the thyratron 46, the igniter of such thyratron is connected by way of a resistor 55 and an adjustable contact 56 to a potentiometer 57 included in series with resistors 58 and 59 in a voltage divider connected between conductors 42 and 14.

A satisfactorily operating apparatus has been found to obtain when thyratron 46 is a 5823 tube, resistor 48 is 4700 ohms, relay means 40 has a drop-out response time of 5 milliseconds and its winding 45 is of 5000 ohms, resistor 58 is 62,000 ohms, resistor 55 is 51,000 ohms, potentiometer 57 has a nominal value of 50,000 ohms, resistor 59 is 68,000 ohms, relay means 31 has a drop-out time of $1/120$ of a second.

*Operation*

In operation of the X-ray apparatus embodying the invention, assume that one or the other of the two sets of terminals 20, 21 or 21, 22 are connected to supply lines to provide the respective voltages for energizing the autotransformer 2, and that it is desired to initiate an X-ray exposure intended to have a selected intensity and to persist for a preselected period of time. The operator will then adjust potentiometer 15 according to the intensity desired to be obtained, and will adjust the operator's knob 30 of the timer 25 according to the exposure time desired.

Subsequent to connection of the autotransformer 2 to the selected supply lines, and prior to initiation of X-ray exposure, the normal 115 or 120 volts A.C. is applied to the cathode of the thyratron tube 46 and to the voltage divider network including resistors 58, 59 and potentiometer 57 through the fixed contact 38 and movable contact 37 of the operator's exposure-initiating switch 36. Potentiometer 57 will have been adjusted to provide, in conjunction with resistor 55, sufficient voltage to the igniter of thyratron tube 46 to assure its conduction under such normal no-load condition of the circuit. Such tube 46, in conducting, permits half wave direct current energization of relay means 40 to hold the normally-open contact 41 closed and the normally-closed contact 43 open. Indicating lamp 44 will be deenergized as a result of the open contact 43.

To initiate the preselected exposure, the operator will then actuate the movable contact 37 of the operator's exposure-initiating switch 36 into engagement with contact 35 to cause energization of the relay means 31 by contact 41, conductor 42, and such movable contact 37. Energization of the relay 34 will then cause closing of its normally open contacts 32 and 33 to render the timer 25 effective to energize timer relay 28 and close its contact 29 for completing an energizing circuit through the primary winding 5 of high voltage transformer 6 through the medium of conductors 3 and 4, and contacts 29 and 32. Assuming only a tolerable voltage drop to occur in the supply lines and hence conductors 13 and 14 upon such initiation of an X-ray exposure, such preselected exposure will persist until terminated by the timer 25 at which time the timer relay 28 will be deenergized, whereupon its contact 29 will open to deenergize the primary winding 5 of the high voltage transformer 6 and thus effect termination of energization of the X-ray tube 1 and the X-ray generation resultant from such energization. Following this, the operator may release the movable contact 37 of switch 36 which will be spring-returned into engagement with fixed contact 38.

It will be noted that under the foregoing circumstances where the exposure does not result in excessive supply voltage drop and is terminated by the timer 25, the thyratron tube 46 remains conductive and maintains the relay means 40 energized to hold its contacts 41, 43 closed and open, respectively, so that such tube 46 remains connected across conductors 13 and 14 and the excessive-voltage-drop-indicating lamp 44 remains de-energized. Upon return of the movable contact 37 of switch 36 into engagement with contact 38, the status of tube 46, relay means 40 and lamp 44 remains unaltered, but the relay means 34 drops out and opens its contact 33 to render the timer 25 ineffective. The fact that the lamp 44 remained de-energized during such performance serves to indicate to the operator that the exposure conditions were satisfactory and did not result in an excessive or unsatisfactory supply line drop.

The above technique may be performed in conjunction with a patient or as a test exposure not directed to the patient. In the former case, the quiescent state of the lamp 44 serves to notify the operator that the exposure need not be repeated due to unsatisfactory supply line voltage drop, and in the latter case, such state of the lamp 44 indicates that the tested technique may then be applied successfully to a patient.

If, however, at the time of initiation of the preselected exposure, the voltage in the supply lines to which the autotransformer 2 is connected, hence in conductors 13 and 14, drops in excess of such as 10%, for example, the voltage across conductors 13 and 14 may then drop from the preload value of such as 120 volts to such as 108 volts. The voltage at movable contact 56 of potentiometer 57 will then drop from a normal value of such as 50 volts to 35 volts, resulting in a cathode-to-igniter voltage of such as 63 volts, which will be insufficient to maintain firing of the thyratron tube 46. Tube 46 then will cease to conduct. Following this, with no more delay than a half-cycle period in which the relay winding 45 is energized by current via the resistor 48 and rectifier 49, such winding 45 will become deenergized and the fast-acting relay means 40 will respond within approximately $1/120$ of a second to open its contact 41 and close its contact 43. Closure of contact 43 will effect energization of the indicator lamp 44 to indicate to the operator the existence of such excessive drop in line voltage, while the opening of contact 41 effects deenergization of the relay means 31 which will respond within a fraction of a second to open its contact 32 for deenergizing the primary winding 5 of the high voltage transformer 6 to thus effect termination of the X-ray exposure. Deenergization of relay means 31 also results in the opening of its contact 33 which deactivates the timer 25, and deenergizes the timer relay 28, thus causing opening of contact 29.

Due to the relatively rapid response time, approximately $1/20$ of a second, for example, in which the X-ray exposure is automatically terminated following an undesired drop in supply line voltage, such exposure will be terminated a considerable period of time prior to that at which it would have been terminated by the timer 25, for most settings of such timer.

Where such exposure resulting in the above-described automatic rapid termination of X-ray generation prematurely of the preselected exposure time is performed in conjunction with a patient, it will be apparent that the ineffectual dosage resultant from the unsatisfactory exposure technique will keep such dosage to a minimum. If, alternatively, the feasibility of the preselected exposure is determined as a test not involving exposure of the patient, unnecessary and ineffectual dosage of such patient will be nil.

The operator, having observed the indicator lamp 44, will be appraised of such excessive or undesired drop in line voltage under the selected exposure conditions. He may then effect adjustment of the potentiometer 15 to call for a reduced X-ray intensity output while compensating for such reduced intensity by adjusting the timer knob 30 to call for an increased exposure time. Following this he may then initiate a second exposure by again manipulating the movable contact 37 of the operator's exposure-initiating switch 36; the relay means 40 and 31 having been re-energized by virtue of conduction through the thyratron tube 46 upon establishment of normal supply line voltages as reflected in conductors 13 and 14 following the aforedescribed automatic termination of the X-ray exposure and return of the movable contact 37, switch 36 into engagement with fixed contact 38.

With experience, the operator will be able to select exposure conditions which will not cause excessive drop in supply line voltage following an initial exposure resulting in such excessive drop. If, however, any of such succeeding attempts should again result in excessive drop in supply line voltage, the aforedescribed operations may be repeated until a successful exposure setting is obtained.

By adjustment of the movable contact 56 of the potentiometer 57 the automatic exposure-terminating circuit means may be made to respond to different percentage reductions in supply line voltage, for example, to as little as 1%, depending upon the sensitivity desired. The particular circuit shown, having particular operating parameters as indicated hereinbefore for exemplification, is capable of operating over a range of voltages across conductors 13 and 14 between 95 and 135 volts A.C. It would be feasible, however, by proper selection of circuit components and minor modifications, to enable the circuit to operate over higher voltage ranges if necessary.

From the foregoing description of the novel X-ray apparatus embodying the invention, it will be apparent that the system described attains the objects of the invention in a simple and economical manner.

While the invention has been described with a certain degree of particularity, it will be apparent to those skilled in the art that minor modifications thereof may be made without departing from the spirit and scope of the invention as defined by the following claims.

I claim as my invention:

1. X-ray apparatus comprising an energizing network for an X-ray tube, regulating means connected with said network for adjusting the output of electrical power therefrom, a selective timing device connected with said network for determining the normal flow period of said power, means connected with said network for limiting the duration of power flow therein to a period of time less than the average period afforded by said selective timing device responsively to a preselected voltage reduction in said network upon energization thereof, and means for indicating occurrence of said voltage reduction.

2. X-ray apparatus comprising an X-ray tube, an energizing network for said tube, regulating means connected with said network for adjusting the output of electrical power supplied therefrom to said X-ray tube, a selective timing device connected with said network for determining the normal flow period of said power, means connected with said network for effecting operation of said timing device and for limiting the duration of energy flow in said network upon a preselected reduction in voltage in said network resultant from its energization, and means for indicating occurrence of said voltage reduction.

3. X-ray apparatus comprising an X-ray tube, an energizing network for said tube, adjustable means for regulating power output from said network, adjustable means for determining the normal flow period of power supplied from said network to said X-ray tube, relay means energizable to assume a first position in which said network may be energized and de-energizable to assume a second position in which said network will be deenergized, a pair of conductors associated with said network whereby the voltage applied thereto may be monitored, a thyratron tube connected across said conductors for energizing said relay means when conductive and de-energizing said relay means when non-conductive, a voltage divider connected across said conductors to furnish a control voltage for the igniter of said thyratron tube whereby same may be rendered conductive during a normal voltage condition and non-conductive upon a preselected voltage drop, signal means to indicate existence of said preselected voltage drop, and an operator's switch means for initiating energization of said energizing network.

4. X-ray apparatus comprising an X-ray tube, an energizing network for said tube, adjustable means for regulating power output from said network, adjustable means for determining the normal flow period of power supplied from said network to said X-ray tube, relay means energizable to assume a first position in which said network may be energized and de-energizable to assume a second position in which said network will be de-energized, a pair of conductors associated with said network whereby the voltage applied thereto may be monitored, a thyratron tube connected across said conductors for energizing said relay means when conductive and de-energizing said relay means when non-conductive, an indicator lamp energized and deenergized according to conduction or non-conduction, respectively, of said thyratron tube, a voltage divider connected across said conductors to furnish a control voltage for the igniter of said thyratron tube whereby same may be rendered conductive during a normal voltage condition and non-conductive upon a preselected voltage drop, signal means to indicate existence of said preselected voltage drop, and an operator's switch means for initiating energization of said energizing network.

5. X-ray apparatus comprising an energizing network for an X-ray tube, adjustable control means for regulating the power output from said network, adjustable timing switch means for determining the period of power supply from said network, and circuit means responsive to a predetermined voltage reduction in said network to promptly deenergize same irrespective of the setting of said timing switch means and to indicate unsatisfactory operation of the X-ray tube at the power level selected by said adjustable control means, thereby reducing the period of unsatisfactory X-ray tube energization to a minimum and apprising the operator of such fact and of the need for reducing the level and increasing the time of power supply to said network.

References Cited in the file of this patent

UNITED STATES PATENTS

| | | |
|---|---|---|
| 2,367,509 | Knowlton | Jan. 16, 1945 |
| 2,572,258 | Goldfield et al. | Oct. 23, 1951 |
| 2,792,503 | Kiesel | May 14, 1957 |
| 2,811,675 | McGee | Oct. 29, 1957 |
| 2,936,376 | Hoekstra | May 10, 1960 |